United States Patent
Devendran et al.

(10) Patent No.: US 10,235,206 B2
(45) Date of Patent: Mar. 19, 2019

(54) UTILIZING INPUT/OUTPUT CONFIGURATION TEMPLATES TO REPRODUCE A COMPUTING ENTITY

(71) Applicant: International Business Machines Corporation, Armonk, NY (US)

(72) Inventors: Saravanan Devendran, Bangalore (IN); Thangadurai Muthusamy, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 261 days.

(21) Appl. No.: 15/219,323

(22) Filed: Jul. 26, 2016

(65) Prior Publication Data

US 2018/0032372 A1 Feb. 1, 2018

(51) Int. Cl.
G06F 9/50 (2006.01)
G06F 13/20 (2006.01)
G06F 9/455 (2018.01)

(52) U.S. Cl.
CPC ........ *G06F 9/5011* (2013.01); *G06F 9/45558* (2013.01); *G06F 13/20* (2013.01); *G06F 2009/45579* (2013.01)

(58) Field of Classification Search
None
See application file for complete search history.

(56) References Cited

U.S. PATENT DOCUMENTS

| | | | |
|---|---|---|---|
| 8,954,592 B1* | 2/2015 | Cormie | H04L 47/783 709/225 |
| 9,396,016 B1* | 7/2016 | Marquardt | G06F 9/45558 |
| 2010/0306354 A1* | 12/2010 | DeHaan | G06F 1/3203 709/222 |
| 2016/0283261 A1* | 9/2016 | Nakatsu | G06F 9/45558 |

* cited by examiner

*Primary Examiner* — Wynuel S Aquino
(74) *Attorney, Agent, or Firm* — Daniel R. Simek

(57) ABSTRACT

A method for reproducing an input/output (I/O) configuration of a computing entity. The method includes a computer processor receiving a request to initiate a first computing entity within a first computing system, where the first computing entity is associated with a first set of I/O configuration information and a first set of I/O resource dictates. The method further includes determining a plurality of I/O resources of the first computing system that are available for allocation and that include a first set of I/O resources that are substantially similar to the first set of I/O resource dictates of the requested first computing entity. The method further includes allocating the first set of I/O resources from the plurality of I/O resources available for allocation. The method further includes provisioning the requested first computing entity within the first computing system based, at least in part, on the allocated first set of I/O resources.

19 Claims, 6 Drawing Sheets

UTILIZING INPUT/OUTPUT CONFIGURATION TEMPLATES TO REPRODUCE A COMPUTING ENTITY

BACKGROUND OF THE INVENTION

The present invention relates generally to the field of data processing systems, and more particularly to reproducing a computing entity and an associated input/output configuration on other computing systems.

Within a networked computing environment, such as a data center, some portions of the environment include computing systems that include various virtualization technologies. The networked computing environment may include: one or more computing systems that include a plurality of interconnected physical resources (e.g., microprocessors, memory, storage devices, communication devices, etc.); a local group/cluster of computing systems, such as racks of blade servers, network-attached storage (NAS) systems, and storage area networks (SANs); distributed computing environments, such as a cloud infrastructure; or any combination thereof. Within a virtualized system, each computing entity behaves as if the computing entity were a separate system, such as a computing node, a storage system, and/or a networking system.

Virtualization is one aspect to solution elasticity, reliability, and security requirements of the workloads of customers in a data processing center or cloud computing environment. Provisioning (e.g., cloning) and deprovisioning of instances of physical and/or virtual computing entities addresses the elasticity requirements of customers that have workloads that are dynamic. Examples of computing entities include, but are not limited to: logical partitions (LPARs), virtual machines (VMs), storage area network (SAN) systems, network-attached storage (NAS) systems, network switches, computing nodes, etc. Computer processors and memory include known characteristics that can be virtualized and allocated (e.g., provisioned) among computing entities. In addition, various storage devices can also be virtualized, and input/output (I/O) resources (e.g., I/O devices) are more varied and can include more specific features that can create configurations unique to a computing entity. Examples of I/O resources include: communication adapters, such as network adapters and communication adapters; co-processors, such as encryption accelerators, field programmable gate arrays (FPGAs), and graphics processing units (GPUs), and compression accelerators; etc.

SUMMARY

Aspects of an embodiment of the present invention disclose a method, computer program product, and computing system for reproducing an input/output (I/O) configuration of a computing entity. The method includes a computer processor receiving a request to initiate a first computing entity within a first computing system, where the first computing entity is associated with a first set of I/O configuration information and the first set of I/O configuration information includes a first set of I/O resource dictates. The method further includes determining a plurality of I/O resources of the first computing system that are available for allocation. The method further includes determining that the plurality of I/O resource available for allocation include a first set of I/O resources that are substantially similar to the first set of I/O resource dictates of the requested first computing entity. The method further includes allocating the first set of I/O resources of the plurality of I/O resources available for allocation based, at least in part, on the first set of I/O resource dictates of the first set of I/O configuration information. The method further includes provisioning the requested first computing entity within the first computing system based on the allocated first set of I/O resources.

DETAILED DESCRIPTION

Figure 1:
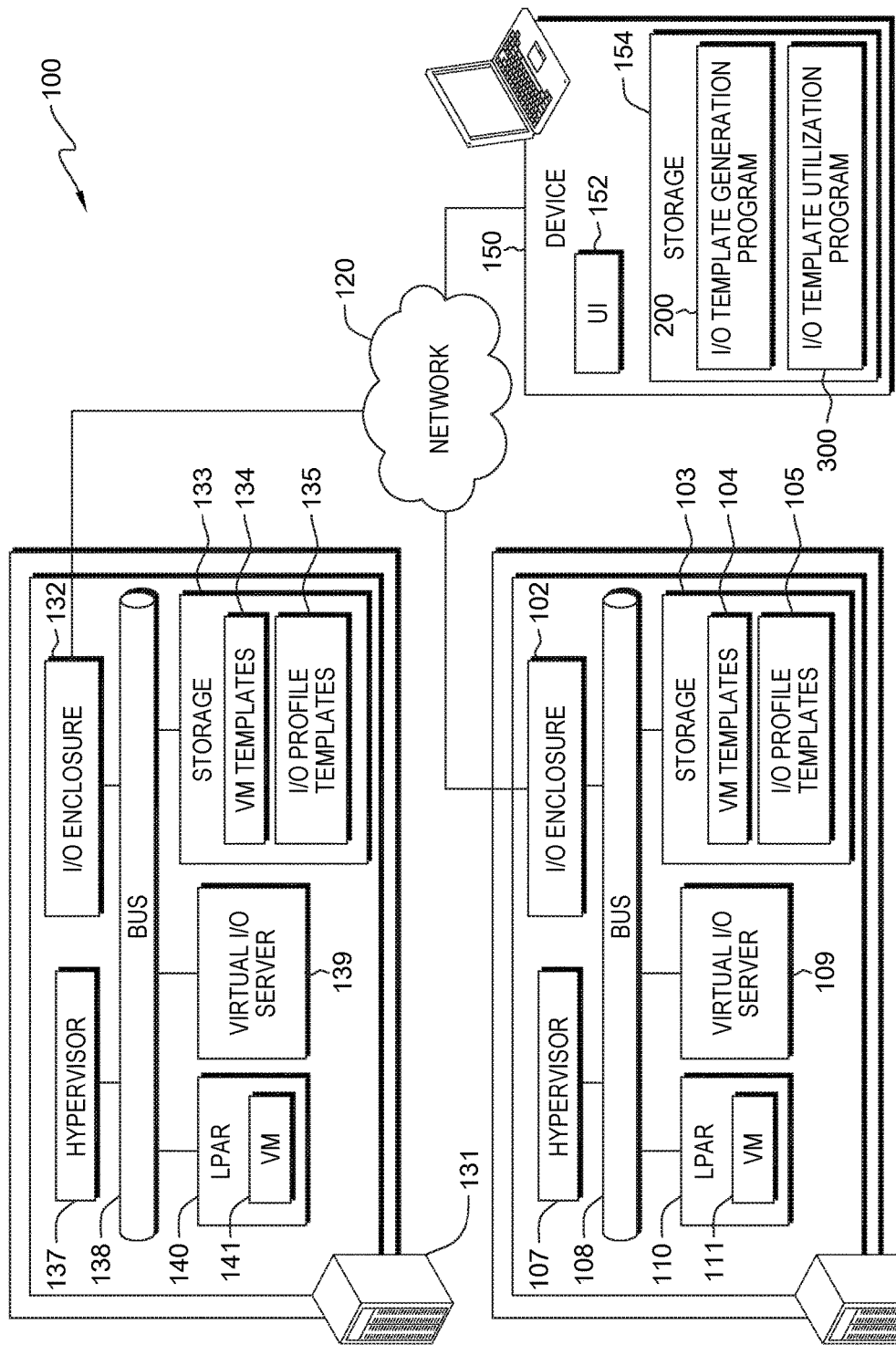
FIG. 1 illustrates a networked computing environment, in accordance with an embodiment of the present invention.

Embodiments of the present invention recognize that the distribution of workloads and computing entities within a networked computing environment is dynamic and similarly, the availability of computing resources is fluid and changeable. Cloning of one or more additional instances of computing entities can provide a solution to the volume of workload assigned to the computing entities. However, cloning the I/O configurations of other computing entities that include more specialized I/O requirements can be a challenge for an administrator of a networked computing environment, such as a cloud computing environment, where computing resources may be located in different physical (e.g., geographic) locations. Generating identical (e.g., cloned) I/O resource configurations may dictate that an administrator of a networked computing environment map the I/O resources (e.g., an inventory of I/O resources, locations of I/O resources, cabling of the I/O resources, etc.) of multiple computing systems. Disseminating lists of currently available I/O resources and remapping the I/O resources as computing entities are provisioned and new requests for computing entities are received can necessitate manual intervention, such as recabling, that can be prone to errors by humans. In addition, manual intervention to clone I/O profiles of computing entities increases costs and delays deploying the computing entities.

Embodiments of the present invention include a methodology to improve and automate the creation of an I/O configuration for a computing entity while minimizing changes to the cabling that generates I/O configuration. Embodiments of the present invention enable a user to define a level of similarity and/or substitution that can be utilized in response to reproducing an I/O configuration for one or more instances of a requested computing entity. Embodiments of the present invention also recognize that elements of an I/O configuration (e.g., an I/O profile) are not equally as critical or that a user may, in some instances, allow trade-offs, such as cost, performance, and/or delayed execution with respect obtaining an I/O configuration to reproduce a computing entity.

Embodiments of the present invention characterize I/O resources utilized by a computing entity, such as an LPAR, a VM, a SAN system, a NAS system, a network switch, and a computing node to generate a configuration template, herein referred to as an I/O profile template, which identifies a set of I/O resources (e.g., I/O elements) that are utilized by the computing entity. An embodiment of the present invention is utilized to apply an I/O profile template in response to initiating: a blade server, a bare-metal computer (e.g., server), a computing node based on non-virtualized I/O resources, and various other computing entities. Other embodiments of the present invention utilize an I/O profile template to clone (e.g., reproduce) a computing entity within a target computing system. Some embodiments of the present invention can be extended to replicating the settings and configurations of a SAN and/or a NAS in response to upgrading or replacement of existing infrastructure of such systems.

Embodiments of the present invention characterize physical and/or virtual I/O resources, such as communication devices, host bus adapters (HBA), network interface cards (NICs), communication adapters, I/O interface cards, co-processors, GPUs, etc., herein identified as I/O adapters. I/O adapters are defined within an I/O profile as I/O elements (e.g., I/O profile elements). Embodiments of the present invention further characterize an I/O adapter based on an adapter type, such as a storage adapter, a network adapter, an accelerator adapter (e.g., co-processor card), a FPGA device, or an other device that can process information that is offloaded by a computer processor (e.g., a core).

Some embodiments of the present invention identify two or more characteristics, such as adapter technology (e.g., device type) and bandwidth for each I/O adapter utilized by a computing entity. In an embodiment, bandwidth is expressed with respect to a rate of transfer of data, such as gigabits per second (Gbps). Bandwidth may be further expressed with respect to other characteristics (e.g., parameters), such as a read speed, a write speed, and a data processing rate, such as I/O operations per second (IOPS). Other embodiments of the present invention may include other characteristics of the I/O adapters utilized by a computing entity, such as receiving cache size and/or on-device hardware support (e.g., encryption). Various embodiments of the present invention may further analyze a computing entity to be cloned to determine whether computing entity and/or program specific information, such as an IP address, port number, or World Wide Port Name (WWPN) is assigned to a specific I/O adapter and/or an I/O function, such as an initiator ID or a target ID.

Embodiments of the present invention can determine a set of physical location information for a plurality of I/O resources that are used in the configuration of a computing entity within a source computing system. An embodiment of the present invention removes the set of physical location information and name of an I/O resource of a computing entity from the characteristics and parameters of the I/O resource. The I/O resource (e.g., adapter) characteristics and parameters for the plurality of I/O resources of a computing entity can be stored as a set of I/O elements in an I/O profile template. In response to applying an I/O profile template and other information of a computing entity to a target computing system, physical location information is identified for the unallocated I/O resources of the target computing system. The information of unallocated I/O resources is sorted based on prioritization scheme and/or hierarchy of characteristics. The physical location information of an I/O resource of the target computing system that is allocated to the requested computing entity is mapped to a related element of an I/O profile template, and the mapping is used to create a configuration for the requested computing entity within the target computing system.

Various embodiments of the present invention enable a degree of substitution of physical and/or virtual I/O resources, such that I/O configurations are not constrained to an exact match of I/O resources. Various embodiments of the present invention allow for allocating I/O resources based on a pattern (e.g., a profile) of I/O resources utilizing I/O resource of similar characteristics. In an example, the present invention may substitute a 2 Gbps Ethernet adapter for a 1 Gbps Ethernet adapter since the adapter (e.g., communication) technology, Ethernet, is the same. Various embodiments of the present invention determine which I/O elements of an I/O profile template are associated with an alternative (e.g., substitute) I/O resource based on one or more key characteristics (e.g., parameters), such as IOPS and protocol. In one example, a 1 Gbps Fibre Channel (FC) adapter may be utilized in lieu of a 2 Gbps Fibre Channel over Ethernet (FCoE) adapter, FCoE technology encapsulates the FC frames, if the 1 Gbps FC adapter has an IOPS rate equal to or greater that the IOPS rate of the 2 Gbps FCoE adapter. In another example, however, an I/O resource that utilizes Ether packets cannot utilize an alternative I/O resource, such as a SCSI adapter or a FC adapter. Alternatively, key characteristics may be utilized to determine whether an I/O resource is substantially similar to an element of an I/O profile as opposed to the I/O resource being treated as an alternative (e.g., substitute) I/O resource.

Further embodiments of the present invention reproduce a computing entity within a target computing system by pausing and/or reallocating I/O resources between computing entities based on a level of priority of the computing entities. In an example, a first computing entity is identified as a low-priority computing entity. However, the first computing entity was provisioned prior to a request for a second computing entity; and therefore, the first computing entity is provisioned with a set of I/O resources without substitution. A request to provision a higher-priority second computing entity is received by the computing system hosting the first computing entity. However, the first computing entity utilizes an I/O resource needed by the second computing entity. In some instances, the first computing entity may be paused and one or more I/O resource may be reallocated to the second computing entity such that the second computing entity can be provisioned. If the first computing entity utilizes alternative I/O capabilities, then the hosting computing system may assign one or more different I/O resources to the first computing entity and restart the first computing entity.

The present invention will now be described in detail with reference to the Figures. FIG. 1 is a functional block diagram illustrating a networked computing environment 100, which includes computing system 101 and computing system 131 (i.e., virtualized computing system), network 120, and device 150, in accordance with the present invention.

Device 150 may be: a laptop computer, a tablet computer, a netbook computer, a personal computer (PC), a desktop computer, a personal digital assistant (PDA), a smart phone, a communications terminal, a wearable device (e.g., digital eyeglasses, a smart watch, etc.), or any programmable computer system known in the art. In certain embodiments, computing system 101, computing system 131, and device 150 represent a computer system utilizing clustered computers and components (e.g., database server computers, application server computers, etc.) that act as a single pool of seamless resources when accessed through network 120, as is common in data centers and in cloud-computing architectures. In general, computing system 101, computing system 131, and device 150 are representative of any programmable electronic device or combination of programmable electronic devices capable of executing machine readable program instructions and communicating with users of computing system 101, computing system 131, and device 150, via network 120. Computing system 101, computing system 131, and device 150 may include components (e.g., physical hardware), as depicted and described in further detail with respect to FIG. 4, in accordance with embodiments of the present invention.

Computing system 101 includes: I/O enclosure 102, storage 103, hypervisor 107, bus 108, virtual I/O server (VIOS) 109, LPAR 110, VM 111, and physical hardware (not shown). The physical hardware of computing system 101 includes a plurality of network cards, such as HBAs, Ethernet adapters, etc. that are included in one or more instances of I/O enclosures 102. Storage 103 includes VM templates 104 and I/O profile templates 105. Hypervisor 107 may be stored in non-volatile memory of computing system 101. Computing system 101 may also include various programs and data (not shown) that enable the operations of computing system 101, such as one or more communication programs, I/O virtualization software, N_Port_ID virtualization (NPIV) software, single root I/O virtualization (SR-IOV), system management programs, monitoring functions, a database management system, etc. included in another portion of storage 103. In a further embodiment, computing system 101 may include an instance of I/O template generation program 200 and/or I/O template utilization program 300 in storage 103.

In an embodiment, computing system 101 is divided into multiple partitions that include LPAR 110. In an example, computing system 101 and LPAR 110 each run an independent operating environment, such as an operating system (OS). In another embodiment, LPAR 110 includes one or more VMs, such as VM 111. In various embodiments, computing system 101 is a node of a clustered computer system, such as a cloud computer. Hypervisor 107 provisions: VIOS 109, LPAR 110, and VM 111 from various physical and/or virtualized resources of computing system 101. In some embodiments, hypervisor 107 virtualizes one or more communication devices (e.g., network adapters) included in I/O enclosure 102.

With respect to computing system 101, communications to and from network 120 are routed through one or more communication devices included in an instance of I/O enclosure 102, such as a HBA or a shared Ethernet adapter (SEA) through bus 108 to: VIOS 109, LPAR 110, and/or hypervisor 107, in accordance with an embodiment of the present invention.

VM templates 104 and/or VM templates 134 include templates for various: VMs, LPARs, virtual appliances, a SAN system, a network switch, a computing node, and/or other computing entities that utilize virtualization or are generated based on virtualization technologies. VM templates 104 and/or VM templates 134 may include: a database, a list, an associative array, etc. that relates a VM template to a corresponding I/O profile template.

I/O profile templates 105 and I/O profile templates 135 include I/O profile templates comprised of I/O profile elements (e.g., I/O resources), a set of information that characterizes each I/O resource, and/or various user/system flags, preferences, constraints, response hierarchies, etc. that are associated with a computing entity (e.g., a VM, a LPAR). For example, a set of information that characterizes an I/O resource, such as a physical I/O adapter or a virtualized I/O device (e.g., entity) can include, but is not limited to: an adapter type, a device type, an I/O bandwidth, a read speed, an IOPS, a generic location identifier, a size of a send queue cache, a communication protocol, hardware (e.g., embedded) encryption capabilities, etc. In an embodiment, each characteristic of an I/O profile element may include an indication that identifies a characteristic as a key characteristic within a hierarchy of importance of I/O resource characteristics. Key characteristics are utilized to determine whether an I/O resource of a computing system is substantially similar. For example, key characteristics of an I/O resource match the key characteristics of an I/O profile element.

In one embodiment, an I/O profile template includes a set of application, middleware, and/or installation specific information that is associated with an I/O profile element, such as a WWPN, an IP address, an encryption key, etc. that is assigned to, or stored within (e.g., in flash memory) of an I/O resource. In some embodiments, an I/O profile template also includes, but is not limited to, information and/or metadata, such as a flag to enable alternative I/O resource selection, a hierarchy of importance of I/O resource characteristics, a range of parameters associated with alternative I/O resource selection, a flag that a specific I/O resource is constrained and cannot be assigned to an I/O resource with an alternative set of characteristics, N_Port ID virtualization, etc. A set of information associated with an I/O template may be linked via: one or more associative arrays, records within a database, etc. In an example, the name and physical location of an I/O resource may be replaced with a random token (e.g., string) within a matrix or an associative array that includes (e.g., lists) the characteristics, such as device type, bandwidth, etc. of each I/O resource utilized by a computing entity. I/O resources are considered substantially similar if one or more key characteristics within a hierarchy of importance of characteristics, such as bandwidth, adapter type, contains an FPGA, etc. are the same.

In other embodiments, a set of information of an I/O profile template of I/O profile templates 105 and/or I/O profile templates 135 may include user preferences, such as I/O resource characteristics used for grouping/sorting I/O profile elements, criteria identifying the I/O resource characteristics associated with a requirement of an I/O profile element, I/O resource cost limits, a level of priority, provisioning request timeout (e.g., delay) information, an acceptable threshold of similarity between I/O resources identified in an I/O profile template of a requested computing entity and the available I/O resources of a target computing system, weight-factors of various I/O resource characteristics utilized to determine a ranking or I/O configuration similarity value for alternate I/O resource configurations, etc. In various embodiments, an I/O profile template includes information that facilitates I/O profile template control and selection for an instance of a computing entity. In an example, an I/O profile template may include an indication, such as a universally unique identifier (UUID) or a serial number that is generated and included in an I/O profile template in response to generating an I/O profile template for a computing entity.

Computing system 131 includes: I/O enclosure 132, storage 133, hypervisor 137, bus 138, VIOS 139, LPAR 140, VM 141, and physical hardware (not shown). The physical hardware of computing system 131 includes a plurality of network cards, such as host bus adapters, Ethernet adapters, etc. that are included in one or more instances of I/O enclosures 132. Storage 133 includes VM templates 134 and I/O profile templates 135. Hypervisor 137 may be stored in non-volatile memory of computing system 131. Computing system 131 may also include various programs and data (not shown) that enable the operations of computing system 131, such as one or more communication programs, I/O virtualization software, N_Port_ID virtualization software, system management programs, system monitoring functions, a database management system, etc. included in another portion of storage 133. In a further embodiment, computing system 131 may include an instance of I/O template generation program 200 and/or I/O template utilization program 300 in storage 133.

In an embodiment, computing system 131 is divided into multiple partitions that include LPAR 140. In an illustrated example, computing system 131 and LPAR 140 each run an independent operating environment, such as an operating system (OS). In some embodiments, LPAR 140 includes one or more VMs, such as VM 141. In various embodiments, computing system 131 is a node of a clustered computer system, such as a cloud computer.

With respect to computing system 131, communications to and from network 120 are routed through one or more communication devices included in an instance of I/O enclosure 132, such as a HBA or a shared Ethernet adapter (SEA) through bus 138 to: VIOS 139, LPAR 140, and/or hypervisor 137, in accordance with an embodiment of the present invention.

In some embodiments, bus 108 and/or bus 138 are generated by a software program that allows one VM to communicate with another VM, utilizing various network fabrics, such as Fibre Channel switch fabric. Some or all of bus 108 and/or bus 138 may be virtual local area networks (VLANs) that are generated utilizing various physical hardware resources of computing system 101 and computing system 131, respectively. In some embodiments, computing system 101 and/or computing system 131 may utilize other technologies, such as a virtual machine communication interface (VMCI), or virtual network interface cards (VNIC), to enhance the communications within the computing system. In an embodiment, bus 108 and/or bus 138 may be embedded into virtualization software or may be included in a server's hardware as part of its firmware. In various embodiments, bus 108 and/or bus 138 may be a combination of physical and virtualized resource that communicate via fiber optic cables, Ethernet cables, wiring harnesses, printed wiring boards (e.g., backplanes), wireless connections, etc. Physical and virtual adapters within computing system 101 and/or computing system 131 may utilize protocols that support communication via virtual port IDs (e.g., NPIV, WWPNs), that communicate with various portions of computing system 101 and/or computing system 131 via an internal communication system, such as bus 108 and bus 138, respectively.

In some embodiments, computing system 101, computing system 131, and device 150 utilize network 120 to communicate, access one or more other computing nodes (not shown) of networked computing environment 100, and another virtualized computing environments (e.g., a cloud computing environment). Network 120 can be, for example, a local area network (LAN), a telecommunications network, a wireless local area network (WLAN), a wide area network (WAN), such as the Internet, a communication fabric/mesh, or any combination of the previous, and can include wired, wireless, or fiber optic connections. In general, network 120 can be any combination of connections and protocols, such as Fibre Channel Protocol (FCP) that will support communications between device 150, computing system 101, and computing system 131, in accordance with embodiments of the present invention. In another embodiment, network 120 operates locally via wired, wireless, or optical connections and can be any combination of connections and protocols (e.g., NFC, laser, infrared, etc.).

Device 150 includes user interface (UI) 152 and storage 154. Storage 154 includes I/O template generation program 200 and I/O template utilization program 300. Storage 154 may also include various programs and data (not shown) that enable various embodiments of the present invention and/or system administration functions for networked computing environment 100. Examples of the various programs and data of device 150 include: a web browser, an e-mail client, security software (e.g., a firewall program, an encryption program, etc.), a telecommunication app, a database management program and one or more databases, etc. Storage 154 may also include one or more VM templates and/or one or more corresponding I/O profile templates that are stored by a user, such as backup templates of critical system entities. In an example, if a portion of network 120 is offline and computing system 101 cannot interface with computing system 131, a user (e.g., a system administrator) can move device 150 to an active network and utilize stored VM templates and I/O profile templates to provision computing entities on other computing system and/or computing nodes (not shown).

In an embodiment, UI 152 is a graphical user interface (GUI) or a web user interface (WUI). UI 152 can display text, documents, forms, web browser windows, user options, application interfaces, and instructions for operation; and include the information, such as graphics, text, and sounds that a program presents to a user. In addition, UI 152 controls sequences/actions that the user employs to access and administrate network computing environment 100, and interface with I/O template generation program 200 and/or I/O template utilization program 300. In some embodiments, a user of device 150 interacts with UI 152 via a singular device, such as a touch screen (e.g., display) that performs both as an input to a GUI/WUI, and as an output device (e.g., a display) presenting a plurality of icons associated with apps and/or images depicting one or more executing software applications. In other embodiments, a software program, such as a web browser and/or one or more system administration functions to generate one or more instances of UI 152 operating within the GUI environment of device 150. In various embodiments, UI 152 receives input in response to a user of device 150 utilizing natural language, such as writing words or speaking words, that device 150 identifies as information and/or commands.

I/O template generation program 200 generates an I/O profile template for a computing entity, such as, but not limited to, a LPAR and/or a VM, by identifying, characterizing, and grouping I/O resources of a computing entity. In one embodiment, I/O template generation program 200 executes in response to determining that a source computing system generates a request to provision another instance of a computing entity on a target computing system. In one scenario, I/O template generation program 200 determines whether an instance of the I/O profile template of the computing entity is included within the source computing system or within a target computing system. If I/O template generation program 200 determines that an instance of an I/O profile template is included on one or more computing systems, then I/O template generation program 200 determines whether the instances of the I/O profile template are the same. If I/O template generation program 200 determines that the instances of the I/O profile template are not the same, then I/O template generation program 200 may communicate with a user. In another scenario, I/O template generation program 200 generates an I/O profile of an active computing entity.

In another embodiment, I/O template generation program 200 executes in response to an administrator and/or user of networked computing system 100 creating a new computing entity, such as a VM. I/O template generation program 200 may pause until the new computing entity is provisioned and executing on a computing system before characterizing the computing entity and provisioned I/O resources.

In some embodiments, prior to generating an I/O profile template for a computing entity, I/O template generation program 200 queries a user to obtain additional information and/or preferences for the I/O profile template or to discard the I/O profile template. In an example, I/O template generation program 200 receives information input by a user to enable the utilization of alternative I/O capabilities and include various values, thresholds, hierarchies, etc. in general for the I/O profile template or specific information related to an I/O element within the I/O profile template. In addition, I/O template generation program 200 may include other program and/or application specific information that is utilized by one or more I/O resources (e.g., elements) of an I/O profile. In other embodiments, I/O template generation program 200 generates an I/O profile template based on analyzing a template and/or configuration file of a computing entity that is stored within a computing system.

In various embodiments, I/O template generation program 200 is included within each computing system (e.g., computing system 101, computing system 131) of a data center. In some scenarios, I/O template generation program 200 is included in a computing system utilized by an administrator of networked computing environment 100, such as device 150. In various scenarios, I/O template generation program 200 is a service that can be accessed by a user via network 120.

In an alternative embodiment, I/O template generation program 200 executes in response to: a maintenance request, such as a scheduled computing system action; an action dictated by an administrator of networked computing environment 100; and/or a request initiated by a user of device 150. In one scenario, I/O template generation program 200 scans I/O profile templates 105 of computing system 101 to identify VM templates within VM templates 104 that correspond to computing entities with I/O profile templates. In one example, I/O template generation program 200 may analyze some or all of the VM templates that include corresponding I/O profile templates. In another example, I/O template generation program 200 may utilize timestamps associated with a VM template and a corresponding I/O profile template to determine whether the VM template changed since the I/O profile template was generated. If I/O template generation program 200 determines that the VM template changed based on a timestamp, then I/O template generation program 200 analyzes the VM template to determine whether the I/O profile template is substantially similar to the I/O elements of the VM template. In another scenario, I/O template generation program 200 may scan the computing systems of networked computing environment 100 to identify which computing system include I/O profile templates in persistent storage. Then I/O template generation program 200 compares corresponding I/O profile templates and communicates differences to an administrator of networked computing environment 100 and/or a user of the identified I/O templates. In various scenarios, I/O template generation program 200 is used (e.g., executes offline) to scan a library of templates of computing entities, such as VM templates 104, to identify the templates of computing entities that do not include a corresponding I/O profile template. I/O template generation program 200 may then generate an I/O profile template for the identified computing entities.

I/O template utilization program 300 monitors requests to initiate, provision, and/or clone a computing entity within a networked computing environment, such as a data center or a cloud computing environment and utilizes an I/O profile template to automate the allocation of I/O resources utilized by the computing entity. In some embodiments, I/O template utilization program 300 utilizes an I/O template that is included within a request to reproduce/clone a computing entity to automatically reproduce the I/O requirements (e.g., dictates) of the requested computing entity. In one embodiment, I/O template utilization program 300 clones a LPAR and/or a VM from one physical computing system to another physical computing system that are networked. In some scenarios, I/O template utilization program 300 clones a computing entity between computing systems within a data center. In other scenarios, I/O template utilization program 300 clones a computing entity between computing systems that are in different physical locations. In one scenario, I/O template utilization program 300 clones one or more additional instances of a computing entity within a computing system.

In a further embodiment, I/O template utilization program 300 automatically duplicates a requested computing entity by allocating, provisioning, and/or virtualizing one or more I/O resources to generate an I/O configuration (e.g., I/O profile) that is similar to the I/O configuration of the requested computing entity. The similar/alternative I/O configuration is based on one or more constraints and/or user preferences that are included within the I/O profile template corresponding to the requested computing entity. In an example, I/O template utilization program 300 does not identify an available I/O adapter that includes parameters dictated by an I/O profile template. I/O template utilization program 300 determines that alternative I/O configurations (e.g., I/O resources) are allowed based on constraints. An example of constraints for an I/O resource are: that the send/receive cache are similar (e.g., not less than 75% of original cache value) and bandwidth of the I/O adapter is not less than half of the dictated bandwidth and not greater than four times the dictated bandwidth. In various embodiments, if I/O template utilization program 300 cannot utilize alternative I/O capabilities or identify alternative I/O resources to utilize, then I/O template utilization program 300 interfaces with an user and/or administrator of a computing system (e.g., a data center).

In an embodiment, I/O template utilization program 300 executes concurrently with I/O template generation program 200. In another embodiment, I/O template utilization program 300 initiates and executes in response to a command and/or query of another computing entity. In an example, computing system 101 detects a precursor event to a fault within computing system 101, and in response, computing system 101 initiates a set of disaster recovery protocols that includes activating I/O template utilization program 300 to clone critical LPARs and VMs within another computing system, such as computing system 131. In some scenarios, an instance of I/O template utilization program 300 is included within each computing system, such as computing system 101 and computing system 131 of networked computing environment 100 (e.g., a data center). In other scenarios, I/O template utilization program 300 is included in a computing system utilized by an administrator of networked computing environment 100, such as device 150. In various scenarios, I/O template utilization program 300 is a service that can be accessed by a user via network 120. In another scenario, an executable instance of I/O utilization program 300 can be included in a virtual appliance or a package of VM templates and I/O template profile templates that are transmitted to another data center for deployment.

Figure 2:
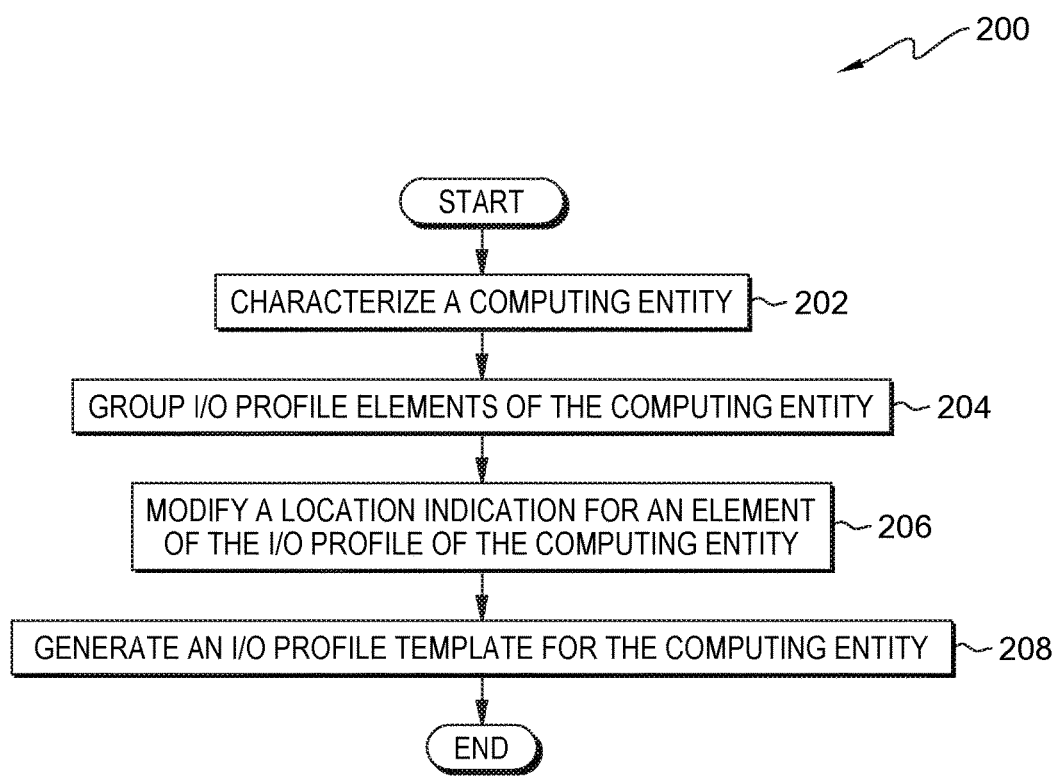
FIG. 2 depicts a flowchart of operational steps of an I/O template generation program, in accordance with an embodiment of the present invention.

FIG. 2 is a flowchart depicting operational steps for I/O template generation program 200 executing within networked computing environment 100 of FIG. 1. I/O template generation program 200 is a program that generates a template that includes a list (e.g., profile) of I/O resources and related characteristics/parameters of each I/O resource utilized by a computing entity, in accordance with embodiments of the present invention.

In an embodiment, I/O template generation program 200 may execute concurrently with I/O template utilization program 300. In another embodiment, an instance of I/O template generation program 200 is included within one or more computing systems of network computing environment 100 as well as device 150. In an example, I/O template generation program 200 is included in storage 133 of computing system 131 as a maintenance function that verifies whether instances of an I/O profile template of a computing entity that are stored on different computing systems are associated with a customized version of the computing entity.

In step 202, I/O template generation program 200 characterizes a computing entity. In one embodiment, I/O template generation program 200 characterizes a computing entity (e.g., a computing entity) that is executing within networked computing environment 100, such as LPAR 110 of computing system 101 or VM 141 of computing system 131. In one embodiment, I/O template generation program 200 characterizes an I/O profile that includes a plurality of I/O elements of a computing entity, such as the number, device type, and characteristics of I/O adapters or other I/O interface components utilized by and/or allocated to the computing entity. In some embodiments, 110 template generation program 200 obtains additional information that is included in an I/O profile of a computing entity by characterizing installation and/or software application specific parameters and/or information associated with one or more I/O profile elements (e.g., I/O adapters) of the computing entity. In an example, 110 template generation program 200 identifies: DNS name information, IP address information, and an encryption protocol for one or more I/O adapters.

In various embodiments, I/O template generation program 200 characterizes one or more I/O profile elements: physical, virtual, or any combination thereof, to determine a set of parameters of each I/O adapter of an I/O profile of a computing entity. I/O template generation program 200 determines parameters of an I/O profile element, such as, but not limited to, an adapter type, a device type, an I/O bandwidth, send queue cache, receive queue cache, a port name for identification/masking, etc. In other embodiments, 110 template generation program 200 includes additional information, such as a character string that corresponds to a physical identification, such as a location and a name of an I/O adapter within a computing system of networked computing environment 100 that is utilized by the computing entity. In an example, I/O template generation program 200 further characterizes (e.g., identifies) an I/O adapter the computing entity as a character string in the format: Name-Enc#-Card#-Port#, such as WIHO78.0102b.KX1069-001-8b-P2. In this example, I/O template generation program 200 characterizes a physical I/O adapter utilized by VM 111, executing within computing system 101 where: Name is WIHO78.0102b.KX1069, Enc# is rack number 001 of I/O enclosure 102, slot 139 (i.e., hex 8b), and port#2 of the I/O adapter.

In step 204, I/O template generation program 200 groups I/O profile elements of the computing entity. In one embodiment, 110 template generation program 200 groups I/O profile elements (e.g., I/O adapters, communication devices, etc.) of the based on device type and bandwidth. In another embodiment, I/O template generation program 200 further groups and/or sorts based on other information within an I/O profile of a computing entity, such as I/O device name based on a constraint that a pair of ports are located on the same physical I/O adapter. In various embodiments, I/O template generation program 200 groups I/O profile elements based on one or more user-defined hierarchies of characteristics, parameters, and/or information of an I/O profile element of a computing entity.

In step 206, I/O template generation program 200 modifies a location indication for an element of the I/O profile of the computing entity. In one embodiment, I/O template generation program 200 modifies computing system (e.g., computing system 101 and I/O enclosure 102) specific information of an element associated with the computing entity, such as the physical location information and a name of an I/O adapter by removing the information from the I/O profile of the computing entity. In another embodiment, I/O template generation program 200 modifies computing system (e.g., computing system 101 and I/O enclosure 102) specific information of an element associated with the computing entity, such as the physical location information and a name of an I/O adapter by replacing the information with a blank field and/or a non-specific token or string.

In step 208, I/O template generation program 200 generates an I/O profile template for the computing entity. In one embodiment, I/O template generation program 200 generates an I/O profile template of the computing entity based on grouped and/or sorted I/O profile element information, such as adapter type, device type, and bandwidth. In some embodiments, I/O template generation program 200 includes an identifier within an I/O profile template or as metadata associated with an I/O profile template to enable tracking and/or version control in response to storing multiple instances of an I/O profile template. In one example, I/O template generation program 200 may include two UUIDs and a timestamp within an I/O profile. A first UUID corresponds to a UUID associated with a VM template of a computing entity. A second UUID and timestamp are included by I/O template generation program 200 during the generation of the I/O profile template to provide uniqueness and traceability. In another example, I/O template generation program 200 utilizes a UUID as a name for a I/O profile template.

In another embodiment, I/O template generation program 200 queries a user via UI 152 to verify and/or edit an I/O profile template. In an example, I/O template generation program 200 generates an I/O profile template for a SAN. A user of device 150 verifies the I/O profile template and identifies the port IDs and other identifiers that will utilize tokens as substitutes for some ports if I/O template utilization program 300 determines that the original SAN is active within networked computing environment 100. In some instances, I/O template generation program 200 utilizes tokens for one or more port IDs and/or addresses of an I/O profile template prevents conflicts within a network when two or more of the same computing entities execute concurrently.

In various embodiments, I/O template generation program 200 queries a user/administrator of networked computing environment 100 to include various I/O resource substitution items, such as parameter thresholds, characteristic hierarchies, alternative configurations, delays/triggers, resource costing constraints, etc., for the I/O profile template of the identified computing entity. In an example, I/O template generation program 200 receives a response that an I/O profile element utilizes a bandwidth of 4 Gbps; however, an I/O resource of a lower bandwidth is acceptable if the read IOPS of the I/O resource exceeds 90K IOPS.

In other embodiments, I/O template generation program 200 stores an I/O profile template on one or more computer systems. In one scenario, I/O template generation program 200 stores the generated I/O profile template on the computing system that includes an executing computing entity that is the basis of the generated I/O profile template. In another scenario, I/O template generation program 200 transmits the I/O profile template that corresponds to a computing entity of a source computing system, such as computing system 101, to a target computing system, such as computing system 131 that is requested to clone the computing entity. In various embodiments, I/O template generation program 200 transmits for storage the generated I/O profile template to each computing system of networked computing system 100 so that a computing entity or multiple instance of the computing entity that utilize the generated I/O profile template can be provisioned, with reduced delay on one or more computing systems of networked computing environment 100. In some scenarios, an I/O template generated by I/O template generation program 200 is stored within persistent storage of a target computing system, such as storage 133 of computing system 131. In other scenarios, an I/O template generated by I/O template generation program 200 may be stored (e.g., cached) in volatile memory, such as RAM of a target computing system.

Figure 3:
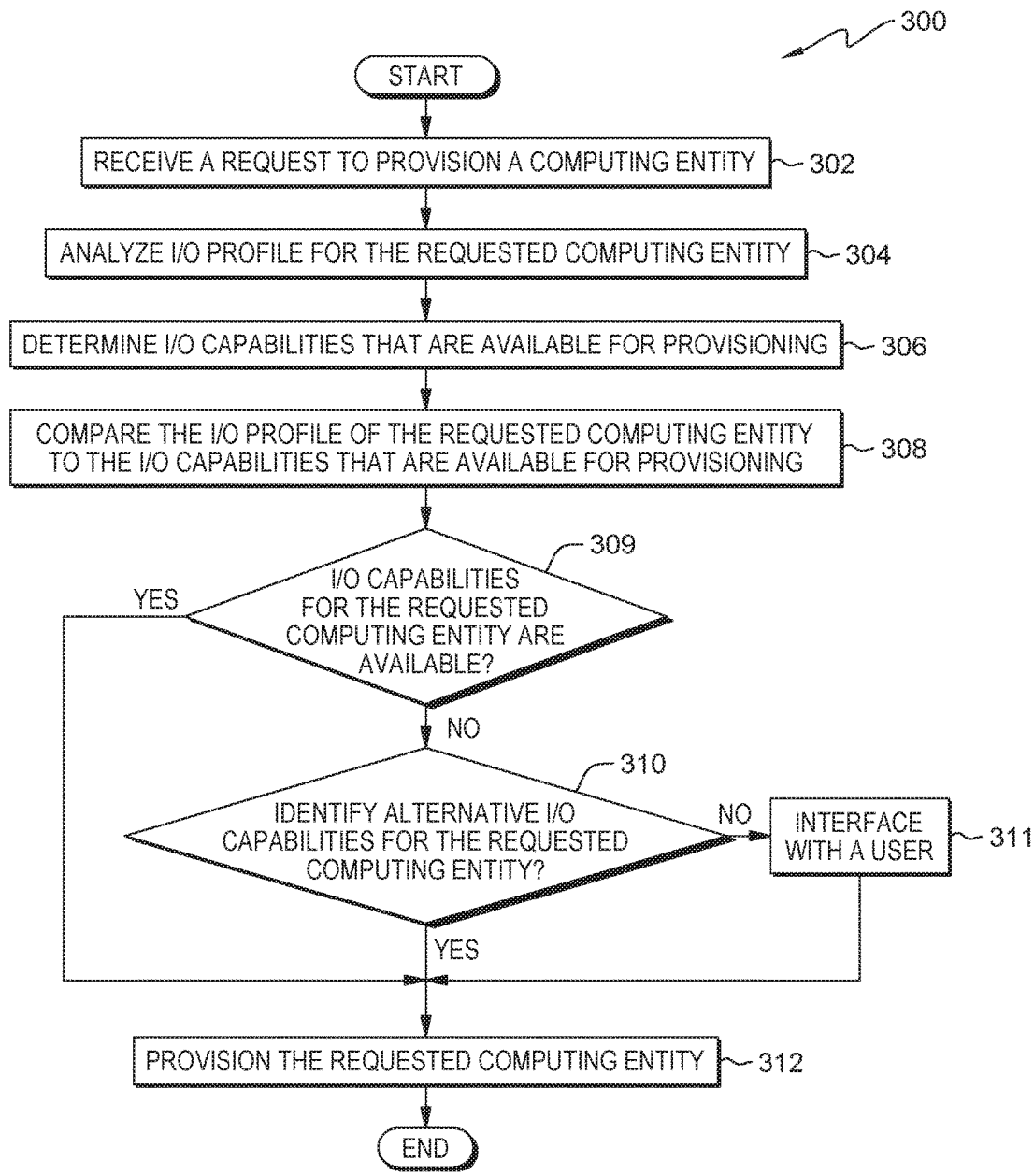
FIG. 3 depicts a flowchart of operational steps of an I/O template utilization program, in accordance with an embodiment of the present invention.

FIG. 3 is a flowchart depicting operational steps for I/O template utilization program 300, executing on computing system 101 of networked computing environment 100 of FIG. 1. I/O template utilization program 300 utilizes an I/O profile template of a computing entity to automate the provisioning of the computing entity within a networked computing environment. Multiple instances of I/O template utilization program 300 can execute concurrently within a computing system. Multiple computing systems within networked computing environment 100 can execute I/O template utilization program 300. In an example, computing system 101 indicates that VM 111 is cloned. Computing system 101 may multicast requests to clone an instance of VM 111 to a plurality of computing systems included in networked computing system 100 that include I/O template utilization program 300. Each computing system utilizes I/O template utilization program 300 to determine whether the computing system can clone VM 111, and I/O template utilization program 300 determines a corresponding "similarity value" or similarity percentage for the available I/O resources of a computing system with respect to the I/O profile template of VM 111.

In step 302, I/O template utilization program 300 receives a request to provision a computing entity. In one embodiment, I/O template utilization program 300 receives a request of a user of device 150 to provision (e.g., clone) a computing entity, such as VIOS 109 executing on source computing system 101, to target computing system 131. In another embodiment, I/O template utilization program 300 receives a request to provision a computing entity based on receiving provisioning information for a computing entity from an automated system function and/or monitor of networked computing environment 100.

In some embodiments, I/O template utilization program 300 identifies that multiple instances of a computing entity are provisioned among the computing system of networked computing environment 100. In an example, I/O template utilization program 300 determines that device 150 communicates a request to provision two instances of a computing entity to support a workload. In other embodiments, I/O template utilization program 300 is included within each computing system of networked computing environment 100. A request to provision one or more instances of a computing entity are multi-cast and received by a plurality of computing systems of networked computing environment 100.

In step 304, I/O template utilization program 300 analyzes an I/O profile of the requested computing entity. In one embodiment, I/O template utilization program 300 analyzes an I/O profile of the computing entity that is included in an I/O profile template communicated with the request to provision (e.g., clone) the computing entity. In another embodiment, I/O template utilization program 300 determines that at least one computing system of networked computing system 100 includes an I/O profile template file. If I/O template utilization program 300 determines that a computing system that includes the I/O profile template file that corresponds to the request computing entity, then I/O template utilization program 300 flags the determined one or more computing systems to a system function, such as a load balancer, to assign the provisioning request to one or more of the flagged computing system of networked computing environment 100.

In some embodiments, I/O template utilization program 300 analyzes an I/O profile template associated with the requested computing entity to determine the I/O resources that are utilized by the requested computing entity, such as a number of I/O resources, the characteristics of each I/O resource identified within the I/O profile template of the requested computing entity, and a set of criteria identifying the I/O resource characteristics associated with a requirement. In various embodiments, I/O template utilization program 300 also analyzes other information included in the I/O profile template of the requested computing entity, such as the utilization of alternative I/O capabilities; user preferences/constraints, such as a cost threshold for utilizing alternative I/O capabilities; a delayed provisioning flag and associated timeout/abort criteria, etc.

In step 306, I/O template utilization program 300 determines I/O capabilities that are available for provisioning. In one embodiment, I/O template utilization program 300 queries a hypervisor and/or a system management program of a computing system to determine the I/O capabilities (e.g., I/O resources) of the computing system, such as computing system 131 that are available for provisioning. In another embodiment, I/O template utilization program 300 queries, via network 120, two or more computing systems of networked computing environment 100 to determine the unallocated I/O capabilities of each computing system that are available for provisioning. In some embodiments, I/O template utilization program 300 utilizes one or more other system monitoring functions and/or system management programs to determine additional information and/or characteristics associated with each unallocated I/O resource. In an example, I/O template utilization program 300 interfaces with another system management program that determines characteristics, such as, but not limited to, a physical location ID, a name, an adapter type, a device type, an I/O bandwidth, a send queue cache, a receive queue cache, a Tx descriptor, etc. of each unallocated I/O resource of a target computing system. In some scenarios, I/O template utilization program 300 may receive additional information from a hypervisor and/or a system management program of the target computing system that identifies one or more unallocated I/O resources that are flagged as "reserved" and are not available to be provisioned.

In other embodiments, I/O template utilization program 300 submits a request for a hypervisor to execute a program, an LPAR template, and/or test VM template (e.g., included in VM templates 134) to provision, on a temporary basis, a plurality of unallocated resources of the target computing system (e.g., computing system 131) to determine the characteristics associated with each unallocated I/O resource. In an example, I/O template utilization program 300 determines from hypervisor 137 that I/O enclosure 132 includes twenty physical I/O resources (e.g., I/O adapters) and VIOS 139 includes fifteen virtualized I/O resource that are unallocated. I/O template utilization program 300 can determine the characteristics of the fifteen unallocated resource of VIOS 139 since the fifteen resource as active (e.g., powered on). However, I/O template utilization program 300 may not be able to characterize one or more resources of I/O enclosure 132 if an I/O resource (e.g., I/O adapter) is idled or powered off to conserve energy. By provisioning, on a temporary basis, a plurality of unallocated I/O resources, I/O template utilization program 300 can characterize the unallocated I/O resources.

In step 308, I/O template utilization program 300 compares an I/O profile of the requested computing entity to the I/O capabilities that are available for provisioning. In one embodiment, I/O template utilization program 300 compares the I/O capabilities of a target computing system that receives a request to provision the computing entity to the I/O profile of the requested computing entity. In another embodiment, I/O template utilization program 300 queries, via network 120, two or more computing systems of networked computing environment 100 to compare the unallocated I/O capabilities of each computing system to the I/O profile of the requested computing entity.

In various embodiments, I/O template utilization program 300 determines whether an I/O profile template includes an indication, such as a flag and/or provision to enable alternative I/O capability (e.g., I/O resource) utilization. If I/O template utilization program 300 determines that an I/O profile template enables alternative I/O capability utilization, then I/O template utilization program 300 ranks and/or quantifies a comparison (e.g., a similarity percentage) of unallocated I/O capabilities of one or more computing system with respect to the I/O profile of the requested computing entity. In one example, I/O template utilization program 300 determines that one target computing system includes eight of ten I/O resources, without substitution, based on an I/O profile template, which generates an 80% similarity percentage. In another example, I/O template utilization program 300 determines a ranking value for a target computing system by summing values (e.g., weight factors) associated with each characteristic of each element of an I/O profile template and the corresponding characteristics that match the available I/O resources of a target computing system.

In some embodiments, if I/O template utilization program 300 determines that the available I/O capabilities of a computing system neither meet nor are within a threshold of alternative I/O capabilities for the requested computing entity, then I/O template utilization program 300 determines whether delayed provisioning is enabled within the I/O profile template. In responses to I/O template utilization program 300 determining that delayed provisioning is enabled, I/O template utilization program 300 pauses (e.g., delays) and monitors (e.g., polls) a hypervisor of a computing system of networked computing environment 100, on a periodic basis, to determine when another computing entity is deprovisioned. In one scenario, I/O template utilization program 300 determines the duration of a delay or timeout period based on information included in the I/O profile template of the requested computing entity. In response to detecting a deprovisioned computing entity, I/O template utilization program 300 determines the I/O capabilities that are available for provisioning (step 306) and compares the I/O profile of the requested computing entity to the current I/O capabilities of a computing system that are available to be provisioned. In another scenario, I/O template utilization program 300 determines that a timeout period for the requested computing entity is exceeded. In one instance, I/O template utilization program 300 may abort. In another instance, I/O template utilization program 300 may interface with a user (step 311).

In decision step 309, I/O template utilization program 300 determines whether I/O capabilities for the requested computing entity are available. In one embodiment, I/O template utilization program 300 determines that based on the comparison of the I/O capabilities that are available for provisioning and the I/O profile of the requested computing entity that the target computing system (e.g., computing system 131) includes unallocated I/O resources to support (e.g., solution) the I/O requirements of the requested computing entity. In another embodiment, I/O template utilization program 300 determines that based on the comparison of the unallocated I/O capabilities of other computing systems within networked computing environment 100 that one or more other computing system include unallocated I/O resource to support the requested to provision the computing entity.

In some embodiments, I/O template utilization program 300 determines that the I/O capabilities for the requested computing entity are not available. In one example, I/O template utilization program 300 determines that the unallocated I/O capabilities of a target computing system do not include a substantially similar set of I/O capabilities (e.g., I/O resources) to provision the requested computing entity. In an example, I/O template utilization program 300 determines that the unallocated I/O capabilities of computing systems of networked computing environment 100 do not include a substantially similar set of I/O capabilities (e.g., I/O resources) to provision the requested computing entity. In response to determining that I/O capabilities for the requested computing entity are not available (No branch, decision step 309), I/O template utilization program 300 determines whether alternative I/O capabilities for the requested computing entity are identified (decision step 310).

In decision step 310, I/O template utilization program 300 identifies alternative I/O capabilities for the requested computing entity. In one embodiment, I/O template utilization program 300 determines that alternative I/O capabilities for the requested computing entity are identified based on a flag/indication within the I/O profile template. In one scenario, I/O template utilization program 300 determines that the I/O profile template includes one or more substitute I/O resources for one or more I/O elements of the I/O profile template of the requested computing entity. In other scenarios, I/O template utilization program 300 further analyzes the comparison of requested I/O resources (e.g., elements) to the I/O capabilities (e.g., ranking, quantification) of a target computing system to identify I/O resources that are included in an alternative I/O profile (e.g., configuration) of the requested computing entity.

In some embodiments, I/O template utilization program 300 analyzes the thresholds and/or hierarchy of characteristics and parameters of the I/O profile template, for the requested computing entity, to identify one or more I/O resources of a target computing system that may be substituted for one or more I/O profile elements associated with an I/O resource that is not available for provisioning. In some scenarios, I/O template utilization program 300 identifies an unallocated I/O resource that can be substituted for an element of an I/O profile of the requested computing entity. In other scenarios, I/O template utilization program 300 communicates with a hypervisor or a VIOS to provision and/or virtualize one unallocated computing resource among two or more alternative I/O resources. In an example, I/O template utilization program 300 determines that an I/O profile of the requested computing entity identifies three I/O resources that cannot be provisioned currently within computing system 131: two 2 Gbps FC adapters and one 4 Gbps FC adapter. I/O template utilization program 300 determines that I/O enclosure 132 includes a 10 Gbps FC adapter. I/O template utilization program 300 communicates with hypervisor 137 and/or another communication function to request to virtualize the 10 Gbps FC adapter to form at least two 2 Gbps FC adapters and one 4 Gbps FC adapter and to include N_Port ID virtualization to create at least three ports from the two physical ports of the 10 Gbps FC adapter.

Still referring to decision step 310 in an embodiment, I/O template utilization program 300 interfaces with a user of device 150 to save the alternative I/O profile as another I/O profile template. In an example, I/O template utilization program 300 determines that computing system 131 does not include sufficient unallocated I/O capabilities to enable the requested computing entity. However, I/O template utilization program 300 identifies an alternative I/O configuration for the requested computing entity and queries a user for a response. I/O template utilization program 300 receives an indication from the user to save the alternative I/O configurations and I/O template utilization program 300 stores the alternative I/O configuration, which includes a new UUID, within I/O profile templates 135.

In another embodiment, I/O template utilization program 300 does not identify alternative I/O capabilities for the requested computing entity. In one scenario, I/O template utilization program 300 determines that an I/O profile template of the requested computing entity does not include an indication and/or provision to enable alternative I/O capability (e.g., I/O resource) utilization. In another scenario, I/O template utilization program 300 determines that alternative I/O capabilities are not identified for the requested computing entity within a computing system of networked computing environment 100. In other embodiments, I/O template utilization program 300 determines that alternative I/O capabilities that are not identified for the requested computing entity based on determining that the available I/O resources of a computing system are not within a threshold and/or hierarchy of alternatives defined within the I/O profile template of the requested computing entity. In response to I/O template utilization program 300 determines that alternative I/O capabilities for the requested computing entity are not identified (No branch, decision step 310), I/O template utilization program 300 interfaces with a user (step 311).

Referring to decision step 309, in response to I/O template utilization program 300 determining that I/O capabilities for the requested computing entity are available (Yes branch, decision step 309), I/O template utilization program 300 provisions the requested computing entity (step 312). Alternatively, referring to decision step 310, in response to I/O template utilization program 300 identifying alternative I/O capabilities for the requested computing entity (Yes branch, decision step 310), I/O template utilization program 300 provisions the requested computing entity (step 312).

In step 312, I/O template utilization program 300 provisions the requested computing entity. In one embodiment, I/O template utilization program 300 provisions the requested computing entity on the target computing system based on utilizing a portion of the unallocated I/O capabilities of the target computing system that are substantially similar to the I/O elements of I/O profile template of the requested computing entity. In another embodiment, I/O template utilization program 300 provisions the requested computing entity on an identified (e.g., another target) computing system of networked computing environment 100, based on utilizing a portion of the unallocated I/O capabilities of the identified computing system that are substantially similar to the I/O elements of the I/O profile template of the requested computing entity.

In some embodiments, I/O template utilization program 300 provisions the requested computing entity on an identified computing system, within networked computing environment 100, based on utilizing an alternative set of I/O capabilities (e.g., I/O resources) that are unallocated. In other embodiments, I/O template utilization program 300 provisions the requested computing entity on a computing system within networked computing environment 100 based on the set of unallocated I/O resources selected by an administrator and/or user of networked computing environment 100 (Step 311). In various embodiments, I/O template utilization program 300 provisions the requested computing entity by utilizing one or more virtualized I/O resources to solution the characteristics (e.g., parameters) of one or more I/O elements of the I/O profile template of the requested computing entity.

Still referring to step 312 in yet another embodiment, I/O template utilization program 300 receives an indication to delay the initiation of the requested computing entity. In a scenario, I/O template utilization program 300 provisions a requested computing entity but delays initiating the requested computing entity based on a constraint of networked computing system 100. In an example, I/O template utilization program 300 receives a request to duplicate a SAN that utilizes an I/O profile template. However, based on network address mapping, network address zoning, and network address masking, I/O template utilization program 300 is constrained to delay the initiation (e.g., start) of the requested SAN until the previous instance of the SAN is removed from networked computing environment 100. In another scenario, I/O template utilization program 300 receives an indication from a user and/or administrator of networked computing environment 100 not to abort the provisioning of the requested computing entity. In response, I/O template utilization program 300 reverts to Step 306 and awaits a response from a hypervisor of a computing system that indicates that one or more I/O resource of another computing entity are deprovisioned and that the I/O resources are available for allocation.

Figure 4:
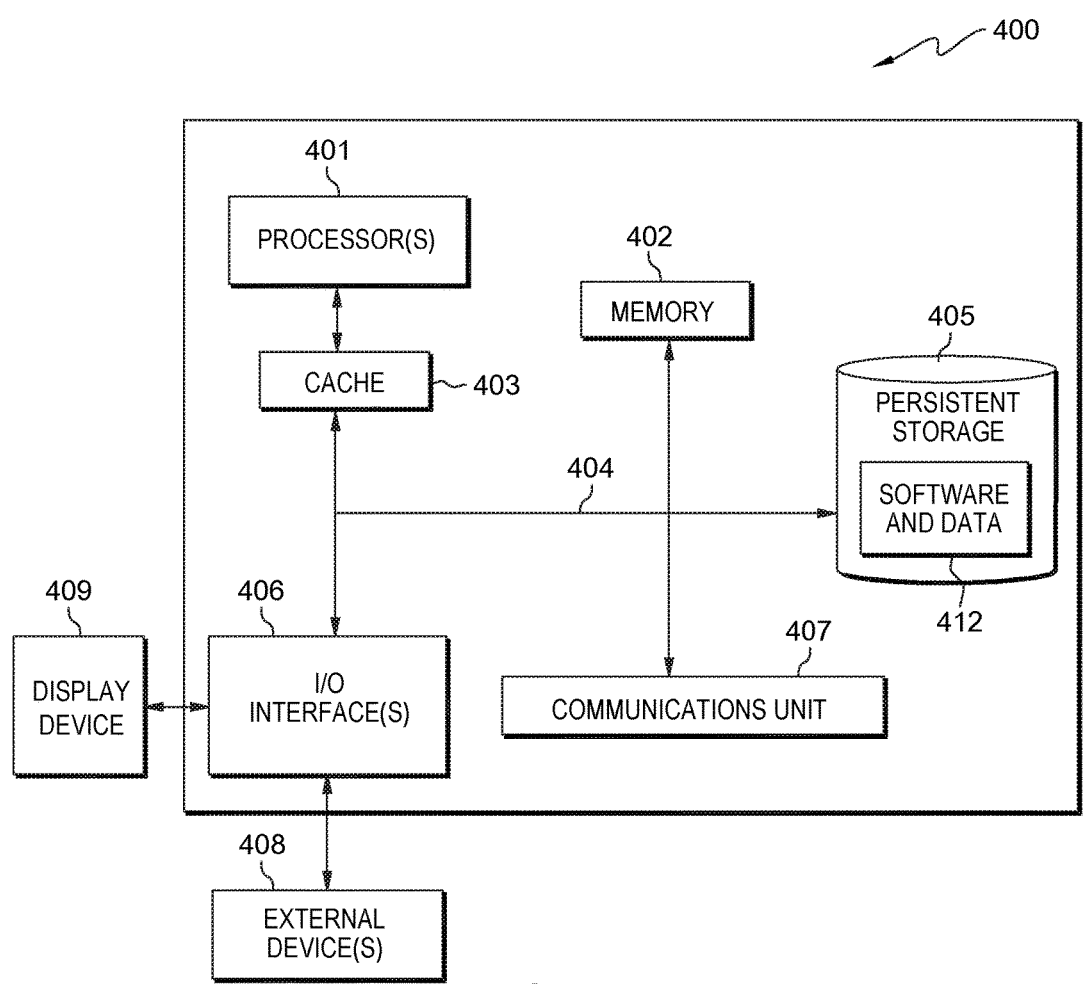
FIG. 4 depicts a block diagram depicting components of a computer, in accordance with an embodiment of the present invention.

FIG. 4 depicts computer system 400, which is representative of computing system 101, computing system 131, and device 150. Computer system 400 is an example of a system that includes software and data 412. Computer system 400 includes processor(s) 401, cache 403, memory 402, persistent storage 405, communications unit 407, input/output (I/O) interface(s) 406, and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processor(s) 401 by holding recently accessed data, and data near recently accessed data, from memory 402.

Program instructions and data used to practice embodiments of the present invention may be stored in persistent storage 405 and in memory 402 for execution by one or more of the respective processor(s) 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Software and data 412 are stored in persistent storage 405 for access and/or execution by one or more of the respective processor(s) 401 via cache 403 and one or more memories of memory 402. With respect to computing system 101, software and data 412 includes: hypervisor 107, and other programs and data (not shown). With respect to computing system 131, software and data 412 includes: hypervisor 137, and other programs and data (not shown). With respect to device 150, software and data 412 includes: I/O template generation program 200, I/O template utilization program 300, and other programs and data (not shown).

Communications unit 407, in these examples, provides for communications with other data processing systems or devices, including resources of computing system 101, computing system 131, and device 150. In these examples, communications unit 407 includes one or more network interface cards. Communications unit 407 can include of one or more communication devices and/or I/O adapters of I/O enclosure 102 and I/O enclosure 132. Communications unit 407 may provide communications through the use of either or both physical and wireless communications links. With respect to computing system 101 and computing system 131, respective instances of software and data 412, program instructions and data, used to practice embodiments of the present invention may be downloaded to respective instances of persistent storage 405 through to respective instances communications unit 407.

I/O interface(s) 406 allows for input and output of data with other devices that may be connected to each computer system. For example, I/O interface(s) 406 may provide a connection to external device(s) 408, such as a keyboard, keypad, a touch screen, and/or some other suitable input device. External device(s) 408 can also include portable computer readable storage media such as, for example, thumb drives, portable optical or magnetic disks, and memory cards. Software and data used to practice embodiments of the present invention can be stored on such portable computer readable storage media and can be loaded onto persistent storage 405 via I/O interface(s) 406. I/O interface(s) 406 also connect to display device 409. I/O interface(s) 406 may also include one or more respective interface cards of computing system 101 and computing system 131 that are utilized by the present invention that are not associated with elements of communication unit 407, such as, but not limited to, accelerator adapters and FPGA adapters.

Display device 409 provides a mechanism to display data to a user and may be, for example, a computer monitor. Display device 409 can also function as a touch screen, such as the display of a tablet computer or a smartphone.

Figure 5:
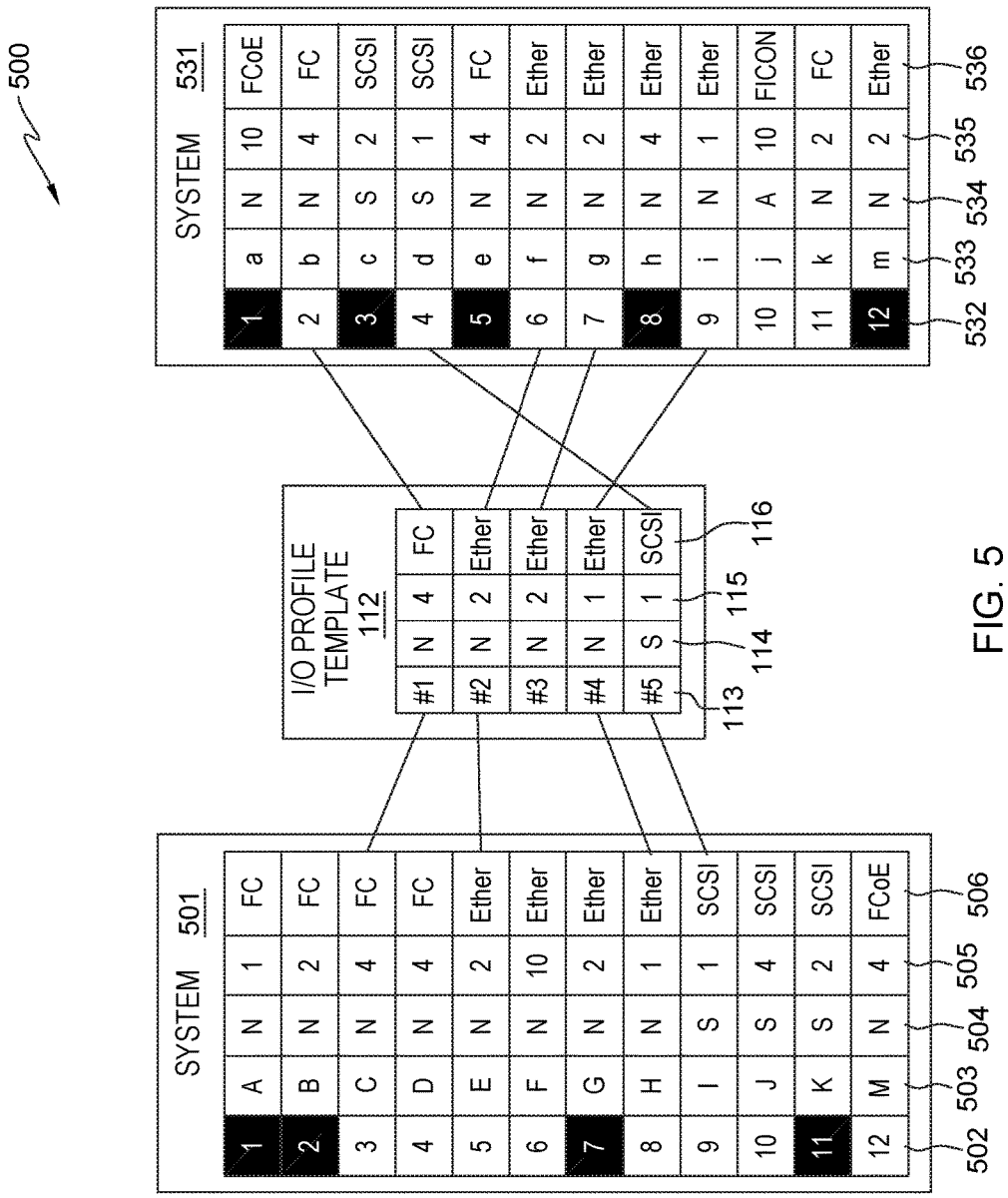
FIG. 5 is an illustrative example of identifying a target computing system based on available I/O resources and an I/O profile template of a computing entity without utilizing alternative I/O capabilities, in accordance with an embodiment of the present invention.

FIG. 5 is an illustrative example of identifying a target computing system based on available I/O resources of target computing systems and a request to provision a computing entity (not shown) that utilizes an I/O profile template without utilizing alternative I/O capabilities, in accordance with an embodiment of the present invention.

In FIG. 5, system 501 and system 531 are illustrative representations of an I/O rack of respective target computing systems of networked computing environment 100. I/O profile template 112 is an example I/O profile template included in I/O profile templates 105 of computing system 101 of networked computing environment 100 (discussed in further detail with respect to FIG. 1). Columns 114, 504, and 534 are correspond to an adapter type of an I/O adapter, such as "N" for a network adapter, "S" storage adapter, and "A" for accelerator adapter.

In an example embodiment, I/O profile template 112 is associated with a computing entity that utilizes five I/O resources, such as physical adapter cards, networking devices, etc. Within I/O profile template 112, rows are associated with an element of the I/O profile of I/O profile template 112, and columns are representative of a characteristic of an I/O element (e.g., I/O resource). Column 113 includes generic representative ID of an I/O adapter of the I/O profile within I/O profile template 112. As indicated by column 114, the computing entity associated with I/O profile template 112 utilizes four network adapters and one storage adapter. Column 115 represents a bandwidth of an I/O element expressed in Gbps. Column 116 indicates an adapter technology of an I/O element, such as FC (i.e., Fibre Channel) and SCSI (i.e., small computer system interface). For example, I/O element #1 is a network adapter that includes a bandwidth of 4 Gbps and utilizes FC technology.

System 501 is representative of a first target computing system within networked computing environment 100 that includes twelve physical I/O resources. Column 502 represents an ID associated with a location of an I/O adapter, such as a slot number within an I/O enclosure. In addition, column 502 includes another indication, the ID of an I/O adapter that is depicted in reverse tone, which indicates that the I/O resource is already allocated or reserved. Column 503 is corresponds to a name of an I/O adapter. In an example, I/O resources 1A, 2B, 7G, and 11K (e.g., location+name) are provisioned to a currently provisioned computing entity that is different from the computing entity associated with I/O profile template 112. Column 505 corresponds to a bandwidth of an I/O adapter expressed in Gbps. Column 506 indicates an adapter technology of an I/O adapter. In an example, a description of an I/O resource of system 501 may be defined with respect to location information (e.g., I/O slot and I/O adapter name), adapter type, bandwidth, and I/O technology, such as 3C-N-4-FC.

System 531 is representative of a second target computing system within networked computing environment 100 that includes twelve physical I/O resources. Column 532 represents an ID associated with a location of an I/O adapter, such as a slot number within an I/O enclosure. In addition, column 532 includes another indication, the ID of an I/O adapter that is depicted in reverse tone, which indicates that the I/O resource is already allocated or reserved. Column 533 is corresponds to a name of an I/O adapter. In an example, I/O resources 1a, 3c, 5e, 8h, and 12m (e.g., location+name) are allocated to a currently provisioned computing entity that is different from the computing entity associated with I/O profile template 112. Column 535 corresponds to a bandwidth of an I/O adapter expressed in Gbps. Column 536 indicates an adapter technology of an I/O adapter.

In one illustrative example, I/O profile utilization program 300 analyzes I/O profile template 112 and determines that I/O profile template 112 does not include an indication (not shown) that indicates that alternative I/O capabilities are enabled (e.g., I/O substitutions are allowed). In an embodiment, O/O profile utilization program 300 communicates with a hypervisor or other system function, respectively associated with system 501 and system 531 to determine the I/O capabilities (e.g., I/O resources) that are available within each system. In this example, I/O resources 3C, 4D, 5E, 6F, 8H, 9I, 10J, and 12M are available on system 501; and I/O resources 2b, 4d, 6f, 7g, 9i, 10j, and 11k are available on system 531.

Subsequently, I/O profile utilization program 300 compares the I/O profile of I/O profile template 112 to the I/O capabilities, available for provisioning, of system 501 and system 531. I/O profile utilization program 300 determines that I/O resources 3C, 5E, 8H, and 9I of system 501 are substantially similar to (e.g., meets) the I/O requirements that correspond to I/O profile elements #1, #2, #4,and #5 of I/O profile template 112. In addition, I/O profile utilization program 300 determines that I/O resources 2b, 6f, 7g, 9i, and 4d of system 531 are substantially similar to the I/O requirements that correspond to I/O profile elements #1, #2, #3, #4, and #5 of I/O profile template 112. Therefore, I/O profile utilization program 300 determines that system 531 includes unallocated I/O capabilities that meet the requirements of I/O profile template 112, and in response provisions the computing entity that utilizes I/O profile template 112 on system 531.

In another illustrative example, I/O profile utilization program 300 analyzes I/O profile template 112 and determines that I/O profile template 112 does not include an indication that indicates that alternative I/O capabilities are enabled. However, in this other example, I/O profile utilization program 300 also determines that delayed provisioning is enabled and includes a timeout/response trigger value of 120-seconds (not shown). In this other example, I/O profile utilization program 300 cannot communicate with system 531 or determines that system 531 is offline. In another embodiment, I/O profile utilization program 300 communicates with a hypervisor or other system function of system 501 to determine the current I/O capabilities that are available within system 501. In this example, I/O resources 3C, 4D, 5E, 6F, 8H, 9I, 10J, and 12M are available on system 501; and I/O resources 1A, 2B, 7G, and 11M are provisioned to a second computing entity.

In this other example, I/O profile utilization program 300 determines that the current I/O capabilities of system 501, as of provisioning timestamp=t+0-seconds, cannot solution the I/O requirements that correspond to I/O profile template 112. In response to determining that delayed provisioning is active, I/O profile utilization program 300 pause as opposed to aborting or interfacing with a user until the timeout period of 120-seconds occurs (e.g., current timestamp>t+120-seconds). I/O profile utilization program 300 periodically polls system 501 to determine subsequent availabilities of I/O resources. For example, I/O profile utilization program 300 polls system 501 at 20-second intervals to determine subsequent availabilities of I/O resources. In this other example, the second computing entity of system 501 is deprovisioned as of t+90-seconds, releasing I/O resources that correspond to IDs 1A, 2B, 7G, and 11M. At t+100-seconds I/O profile utilization program 300 polls system 501 to determine which I/O resources are available and determines I/O resources that correspond to IDs 3C, 5E, 7G, 8H, and 9I are available and meet the I/O profile requirements of I/O profile template 112. In response, I/O profile utilization program 300 allocates the I/O resources that correspond to IDs C3, 5E, 7G, 8H, and 9I of system 501 and provisions the computing entity associated with I/O profile template 112.

Figure 6:
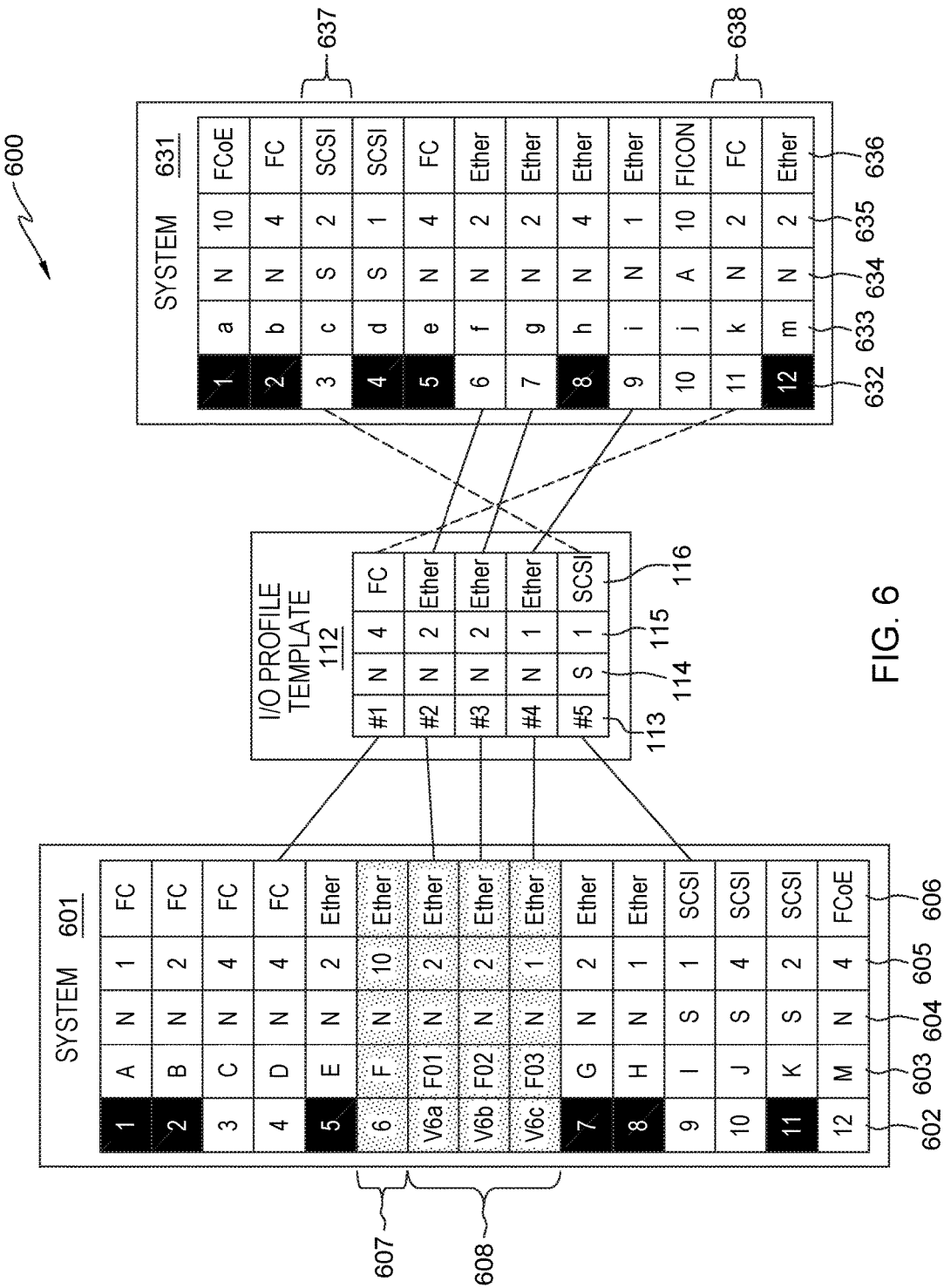
FIG. 6 is an illustrative example of identifying a target computing system based on available I/O resources and an I/O profile template of a computing entity and utilizing alternative I/O capabilities, in accordance with an embodiment of the present invention.

FIG. 6 is an illustrative example of identifying a target computing system based on available I/O resources of target computing systems, a request to provision a computing entity (not shown) that utilizes an I/O profile template, and an I/O profile template that permits utilizing alternative I/O capabilities, in accordance with an embodiment of the present invention. Columns 114, 604, and 634 are correspond to an adapter type of an I/O adapter, such as "N" for a network adapter, "S" storage adapter, and "A" for accelerator adapter.

In one embodiment, I/O profile utilization program 300 solutions the I/O requirements of a computing entity that utilizes I/O profile template 112 by requesting the hypervisor (not shown) of system 601 to virtualize an I/O resource. In another embodiment, I/O profile utilization program 300 solutions the I/O requirements of a computing entity that utilizes I/O profile template 112 by utilizing the available I/O resources of system 631 and one or more alternative (e.g., substitute) I/O resources of system 631. In this example, I/O profile template includes one or more alternative criteria (not shown), such as IOPS; and/or user preferences (not shown), such as bandwidth upgrading (e.g., identifying a bandwidth greater than the bandwidth of an I/O element) for two or more I/O profile elements within I/O profile template 112. In a further embodiment, I/O profile utilization program 300 utilizes another user preference such as cost to determine whether the requested computing entity is provisioned on system 601 or on system 631, in response to I/O profile utilization program 300 determining that both systems can provide alternative I/O capabilities to solution the requirements of the computing entity that utilizes I/O profile template 112.

In this illustrative example, system 601 is representative of system 501 (referring to FIG. 5) at another instance of time and with a different allocation of I/O resources to one or more currently provisioned computing entities. System 601 is representative of a first target computing system within networked computing environment 100 that includes twelve physical I/O resources. In this example, one physical I/O resource is virtualized in response to a request to provision a computing entity based on I/O profile template 112. Column 602 represents an ID associated with a location of an I/O adapter, such as a slot number within an I/O enclosure. In addition, column 602 includes another indication, the ID of an I/O adapter that is depicted in reverse tone, which indicates that the I/O resource is already allocated or reserved. Column 603 is corresponds to a name of an I/O adapter. In an example, I/O resources 1A, 2B, 5E, 7G, 8H, and 11K (e.g., location+name) are allocated to a currently provisioned computing entity that is different from the computing entity that utilizes I/O profile template 112. Column 605 corresponds to a bandwidth of an I/O adapter expressed in Gbps. Column 606 indicates an adapter technology of an I/O adapter.

In this illustrative example, system 601 includes two unallocated I/O resources that meet the requirements of I/O profile template 112, I/O resource 4D and 9I. I/O profile utilization program 300 analyzes I/O profile template 112 and determines that I/O virtualization and alternative port IDs are included in one or more user preferences (not shown) within I/O profile template 112. In addition, I/O profile utilization program 300 determines that I/O elements #2, #3, and #4 dictate the use of the same adapter type, "N" and the same adapter technology, "Ether(net)." Therefore, I/O profile utilization program 300 can determine a combined bandwidth of these three I/O profile elements, 5 Gbps (e.g., 2+2+1 Gbps). Based on the determined I/O capabilities of system 601, I/O profile utilization program 300 determines that I/O resource 6F, associated with I/O resource description 607, includes capabilities that meet or exceed the requirements of I/O profile elements #2, #3, and #4. I/O resource description 607 indicates that I/O resource 6F is a network adapter utilizing Ether(net) technology and includes a bandwidth of 10 Gbps.

In an example, I/O profile utilization program 300 transmits a request to system 601 to virtualize I/O resource 6F to produce three virtual I/O resource with Ether(net) capabilities and bandwidths of 2 Gbps, 2 Gbps, and 1 Gbps. In response, system 601 virtualizes, as indicated by stipple shading, I/O resource 6F to generate a set of virtual I/O resources 608 identified as V6aF01, V6bF02, and V6cF03. I/O profile utilization program 300 determines that I/O resources 3C, V6aF01, V6bF02, V6cF03, and 9I may be respectively assigned to I/O elements #1, #2, #3, #4, and #5 of I/O profile template 112 that is associated with the requested computing entity.

In this other illustrative example, system 631 is representative of system 531 (referring to FIG. 5) at another instance of time and with a different allocation of I/O resources to one or more currently provisioned computing entities. System 631 is representative of a second target computing system within networked computing environment 100 that includes twelve physical I/O resources. Column 632 represents an ID associated with a location of an I/O adapter, such as a slot number within an I/O enclosure. In addition, column 632 includes another indication, the ID of an I/O adapter that is depicted in reverse tone, which indicates that the I/O resource is already allocated or reserved. Column 633 is corresponds to a name of an I/O adapter. In an example, I/O resources 1a, 2b, 4d, 5e, 8h, and 12m (e.g., location+name) are allocated to a currently provisioned computing entity that is different from the computing entity that utilizes I/O profile template 112. Column 635 corresponds to a bandwidth of an I/O adapter expressed in Gbps. Column 636 indicates an adapter technology of an I/O adapter.

With respect to system 631, I/O profile utilization program 300 determines that the current I/O capabilities of system 631 can only meet the requirements of I/O profile template 112 for I/O elements #2, #3, and #4. However, upon analysis of I/O profile template 112, I/O profile utilization program 300 determines that alternative I/O capabilities are enabled and that I/O profile template 112 includes a user preference, threshold ranges for bandwidth, as a primary criteria of a hierarchy if a bandwidth dictated for an I/O element cannot be solutioned. In one instance, I/O profile utilization program 300 determines that I/O profile template 112 includes a primary bandwidth criterion (not shown) that enables upgrading to an I/O resource with similar characteristics and a bandwidth up to 100% faster than the I/O bandwidth of an I/O profile element. In this instance, I/O profile utilization program 300 determines that the I/O resource description 637 (e.g., I/O resource 3c) meets this criterion. The selection of an alternative I/O resource is signified by a dashed line, such as linking I/O resource 3c to I/O profile template 112 element #5.

In another instance, I/O profile utilization program 300 cannot identify an I/O resource within system 631 that solutions the I/O characteristic requirements of element #1 of I/O profile template 112 based on the primary alternative capability criterion of upgrading of bandwidth. I/O profile utilization program 300 determines that I/O profile template 112 does not include a downgrading criterion. However, I/O profile utilization program 300 determines that I/O profile template 112 includes a secondary criterion with respect to determining whether the bandwidth of an I/O resource meets the requirements of an I/O template element, IOPS. I/O profile utilization program 300 determines that profile element #1 of I/O profile template 112 includes a secondary criterion of a minimum IOPS rate of 100K. I/O profile utilization program 300 queries system 631 to identity and/or determine the IOPS of I/O resource description 638 (e.g., I/O resource 11k). If system 631 responds to I/O profile utilization program 300 with a value of 100K or greater IOPS, then I/O profile utilization program 300 can utilize I/O resource 11k to solution the I/O requirements of profile element #1.

In the examples associated with FIG. 6, I/O profile utilization program 300 determines that system 601 and system 631 include I/O resources that support a requested computing entity that utilizes I/O template 112 if alternative I/O capabilities are enabled. If a single instance of the computing entity is to be provisioned, then I/O profile utilization program 300 determines which target system receives the provisioning request. I/O profile utilization program 300 may select between system 601 and system 631 based on another user preference such as, cost or response time.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is understood in advance that although this disclosure discusses system virtualization, implementation of the teachings recited herein are not limited to a virtualized computing environment. Rather, the embodiments of the present invention are capable of being implemented in conjunction with any type of clustered computing environment now known (e.g., cloud computing) or later developed.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for reproducing an input/output (I/O) configuration of a computing entity within a networked computing environment, the method comprising:
receiving, by a hypervisor, a request to initiate a first computing entity within a first computing system, wherein the first computing entity is associated with a first set of I/O configuration information that includes a first set of I/O resource dictates and a set of information related to selecting one or more alternative I/O resources to utilize, and wherein the set of information related to selecting one or more alternative I/O resources to utilize further includes one or more criteria related to alternative I/O resource utilization;
determining, by the hypervisor, a plurality of I/O resources of the first computing system that are available for allocation;
determining, by the hypervisor, that the plurality of I/O resource available for allocation does not include a set of I/O resources that are substantially similar to the first set of I/O resource dictates of the requested first computing entity;
responsive to determining that the plurality of I/O resources available for allocation does not include the set of I/O resources that are substantially similar to the received first set of I/O resource dictates, determining, by the hypervisor, another set of I/O resources included in the plurality of I/O resources available for allocation, based on the set of information related to selecting one or more alternative I/O resources to utilize within the first set of I/O configuration information;
allocating, by the hypervisor, the other set of I/O resources of the plurality of I/O resources available for allocation based, at least in part, on the first set of I/O resource dictates of the first set of I/O configuration information and the one or more criteria related to selecting one or more alternative I/O resources to utilize within the first set of I/O configuration information, wherein the one or more criteria related to selecting one or more alternative I/O resources to utilize includes a criterion for selecting an alternative I/O resource based on a range of values for a bandwidth of an I/O resource; and
provisioning, by the hypervisor, the requested first computing entity within the first computing system based on the allocated other set of I/O resources.

2. The method of claim 1, wherein a computing entity is selected from the group consisting of a virtual machine (VM) and a logical partition (LPAR).

3. The method of claim 1, wherein an I/O resource is further identified by a bandwidth, an I/O technology, and an I/O device type.

4. The method of claim 1, wherein an I/O resource is selected from the group consisting of a physical I/O resource and a virtualized I/O resource.

5. The method of claim 1, wherein allocating the second other set of I/O resources of the plurality of I/O resources available for allocation further comprises:
virtualizing, by the hypervisor, a physical I/O resource, of the plurality of I/O resources of the first computing system; and
allocating, by the hypervisor, a portion of one or more physical characteristics of the physical I/O resource to two or more virtualized I/O resources.

6. The method of claim 1, wherein the one or more criteria related to alternative I/O resource utilization includes another criterion for selecting the alternative I/O resource based on substituting an I/O device of a first network technology for a different I/O device of a compatible network technology.

7. The method of claim 1, wherein the range of values for the bandwidth of the I/O resource is further based on a bandwidth dictate corresponding to the I/O resource included in the first set of I/O configuration information, a value corresponding to a maximum bandwidth for the alternative I/O resource, and another value corresponding to a minimum bandwidth value for the alternative I/O resource.

8. A computer program product for reproducing an input/output (I/O) configuration of a computing entity within a networked computing environment, the computer program product comprising:
one or more computer readable storage media and program instructions stored on the one or more computer readable storage media, the program instructions readable/executable by one or more computer processors:
program instructions to receive to a hypervisor a request to initiate a first computing entity within a first computing system, wherein the first computing entity is associated with a first set of I/O configuration information that includes a first set of I/O resource dictates and a set of information related to selecting one or more alternative I/O resources to utilize, and wherein the set of information related to selecting one or more alternative I/O resources to utilize further includes one or more criteria related to alternative I/O resource utilization;
program instructions to determine a plurality of I/O resources of the first computing system that are available for allocation by the hypervisor;
program instructions to determine that the plurality of I/O resource available for allocation does not include a set of I/O resources that are substantially similar to the first set of I/O resource dictates of the requested first computing entity;
responsive to determining that the plurality of I/O resources available for allocation does not include the set of I/O resources that are substantially similar to the received first set of I/O resource dictates, program instruction to determine another set of I/O resources included in the plurality of I/O resources available for allocation, based on the set of information related to selecting one or more alternative I/O resources to utilize within the first set of I/O configuration information;
program instructions to allocate, by the hypervisor, the other set of I/O resources of the plurality of I/O resources available for allocation based, at least in part, on the first set of I/O resource dictates of the first set of I/O configuration information and the one or more criteria related to alternative I/O resource utilization within the first set of I/O configuration information, wherein the one or more criteria related to alternative I/O resource utilization includes a criterion for selecting an alternative I/O resource based on a range of values for a bandwidth of an I/O resource; and
program instructions to provision, by the hypervisor, the requested first computing entity within the first computing system based on the allocated other set of I/O resources.

9. The computer program product of claim 8, wherein a computing entity is selected from the group consisting of a virtual machine (VM) and a logical partition (LPAR).

10. The computer program product of claim 8, wherein an I/O resource is further identified by a bandwidth, an I/O technology, and an I/O device type.

11. The computer program product of claim 8, wherein an I/O resource is selected from the group consisting of a physical I/O resource and a virtualized I/O resource.

12. The computer program product of claim 8, wherein program instructions to allocate, by the hypervisor, the other set of I/O resources of the plurality of I/O resources available for allocation further comprises:
   program instructions to virtualize, by the hypervisor, a physical I/O resource, of the plurality of I/O resources of the first computing system; and
   program instructions to allocate, by the hypervisor, a portion of one or more physical characteristics of the physical I/O resource to two or more virtualized I/O resources.

13. The computer program product of claim 8, wherein the one or more criteria related to alternative I/O resource utilization includes another criterion for selecting the alternative I/O resource based on substituting an I/O device of a first network technology for a different I/O device of a compatible network technology.

14. A computer system for reproducing an input/output (I/O) configuration of a computing entity within a networked computing environment, the computer system comprising:
   one or more computer processors;
   one or more computer readable storage media; and
   program instructions stored on the computer readable storage media for execution by at least one of the one or more processors, the program instructions comprising:
      program instructions to receive, to the hypervisor, a request to initiate a first computing entity within a first computing system, wherein the first computing entity is associated with a first set of I/O configuration information that includes a first set of I/O resource dictates and a set of information related to selecting one or more alternative I/O resources to utilize, and wherein the set of information related to selecting one or more alternative I/O resources to utilize further includes one or more criteria related to alternative I/O resource utilization;
      program instructions to determine a plurality of I/O resources of the first computing system that are available for allocation by the hypervisor;
      program instructions to determine that the plurality of I/O resource available for allocation does not include a set of I/O resources that are substantially similar to the first set of I/O resource dictates of the requested first computing entity;
      responsive to determining that the plurality of I/O resources available for allocation does not include the set of I/O resources that are substantially similar to the received first set of I/O resource dictates, program instruction to determine another set of I/O resources included in the plurality of I/O resources available for allocation, based on the set of information related to selecting one or more alternative I/O resources to utilize within the first set of I/O configuration information;
      program instructions to allocate, by the hypervisor, the other set of I/O resources of the plurality of I/O resources available for allocation based, at least in part, on the first set of I/O resource dictates of the first set of I/O configuration information and the one or more criteria related to alternative I/O resource utilization within the first set of I/O configuration information, wherein the one or more criteria related to alternative I/O resource utilization includes a criterion for selecting an alternative I/O resource based on a range of values for a bandwidth of an I/O resource; and
      program instructions to provision, by the hypervisor, the requested first computing entity within the first computing system based on the allocated other set of I/O resources.

15. The computer system of claim 14, wherein a computing entity is selected from the group consisting of a virtual machine (VM) and a logical partition (LPAR).

16. The computer system of claim 14, wherein an I/O resource is further identified by a bandwidth, an I/O technology, and an I/O device type.

17. The computer system of claim 14, wherein an I/O resource is selected from the group consisting of a physical I/O resource and a virtualized I/O resource.

18. The computer system of claim 14, wherein program instructions to allocate, by the hypervisor, the other set of I/O resources of the plurality of I/O resources available for allocation further comprises:
   program instructions to virtualize, by the hypervisor, a physical I/O resource, of the plurality of I/O resources of the first computing system; and
   program instructions to allocate, by the hypervisor, a portion of one or more physical characteristics of the physical I/O resource to two or more virtualized I/O resources.

19. The computer system of claim 14, wherein the one or more criteria related to alternative I/O resource utilization includes another criterion for selecting the alternative I/O resource based on substituting an I/O device of a first network technology for a different I/O device of a compatible network technology.

* * * * *